United States Patent
Kusabuka

(10) Patent No.: US 11,163,228 B2
(45) Date of Patent: Nov. 2, 2021

(54) DEVICE AND METHOD FOR FORMING SCREEN, PROGRAM, AND VIDEO PRESENTATION DEVICE

(71) Applicant: NIPPON TELEGRAPH AND TELEPHONE CORPORATION, Tokyo (JP)

(72) Inventor: Takahiro Kusabuka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/970,900

(22) PCT Filed: Feb. 21, 2019

(86) PCT No.: PCT/JP2019/006600
§ 371 (c)(1),
(2) Date: Aug. 18, 2020

(87) PCT Pub. No.: WO2019/163905
PCT Pub. Date: Aug. 29, 2019

(65) Prior Publication Data
US 2020/0387063 A1    Dec. 10, 2020

(30) Foreign Application Priority Data

Feb. 22, 2018    (JP) .............................. JP2018-029933

(51) Int. Cl.
*G03B 21/608* (2014.01)
*G03B 21/14* (2006.01)
*G03B 21/56* (2006.01)

(52) U.S. Cl.
CPC ......... *G03B 21/608* (2013.01); *G03B 21/145* (2013.01); *G03B 21/56* (2013.01)

(58) Field of Classification Search
CPC .... G03B 21/608; G03B 21/145; G03B 21/56; G03B 21/60
See application file for complete search history.

(56) References Cited

U.S. PATENT DOCUMENTS 6,819,487 B2 *  11/2004  Palovuori ............ G03B 21/608
                                                    353/28
6,997,558 B2 *   2/2006  Perlin ................... G02B 30/50
                                                    353/7
8,289,274 B2 *  10/2012  Sliwa ..................... G03B 25/00
                                                    345/108

(Continued)

OTHER PUBLICATIONS

Asuka Yagi, Masataka Imura, Yoshihiro Kuroda, Osamu Oshiro. "360-Degree Observable Fog Display." Journal of the Japan Society for Virtual Reality, vol. 17, No. 4 (2012), pp. 409-417. Machine translation attached.

*Primary Examiner* — William C. Dowling
(74) *Attorney, Agent, or Firm* — Harness, Dickey & Pierce, P.L.C.

(57) ABSTRACT

A screen forming apparatus 20 includes: a particle source selecting unit 24 which selects a particle source to be used from a plurality of particle sources 22 having different characteristics regarding a viewing angle; a vaporizing unit 26 which vaporizes particles acquired from the particle source selected by the particle source selecting unit 24; and a screen forming unit 28 which forms a screen using the particles vaporized by the vaporizing unit 26.

5 Claims, 5 Drawing Sheets

(56) References Cited

U.S. PATENT DOCUMENTS

| | | | |
|---|---|---|---|
| 9,229,311 B2* | 1/2016 | Yeremian | G03B 21/10 |
| 10,197,904 B2* | 2/2019 | Evreinov | G03B 21/58 |
| 2004/0001182 A1* | 1/2004 | Dyner | G09F 19/18 |
| | | | 353/28 |

* cited by examiner

[Fig. 1]
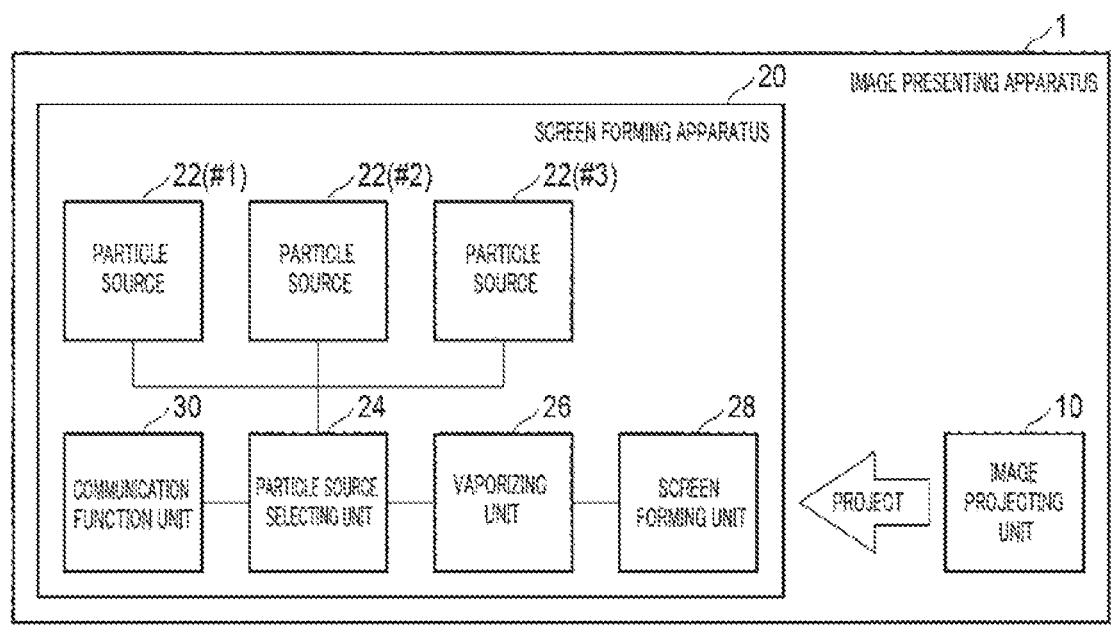

[Fig. 2]
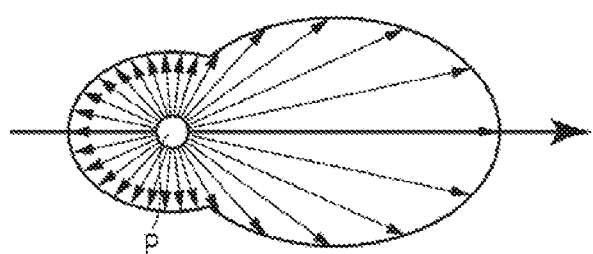

[Fig. 3]
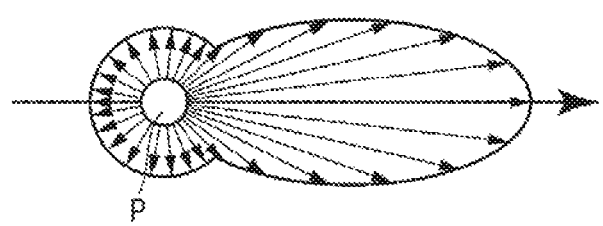

[Fig. 4]
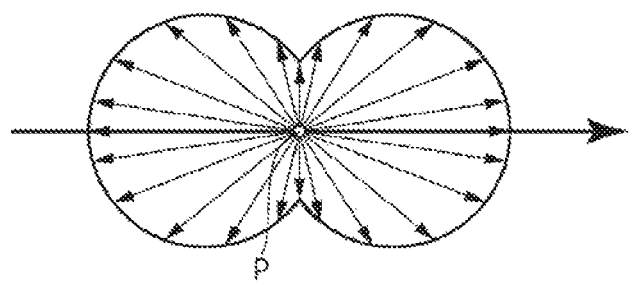

[Fig. 5]

```
        START
          │
          ▼
┌─────────────────────┐
│   SELECT PARTICLES  │──── S1
└─────────────────────┘
          │
          ▼
┌─────────────────────┐
│ VAPORIZE SELECTED PARTICLES │──── S2
└─────────────────────┘
          │
          ▼
┌─────────────────────────────────┐
│ FORM SCREEN USING VAPORIZED PARTICLES │──── S3
└─────────────────────────────────┘
          │
          ▼
         END
```

DEVICE AND METHOD FOR FORMING SCREEN, PROGRAM, AND VIDEO PRESENTATION DEVICE

CROSS-REFERENCE TO RELATED APPLICATIONS

This application is a 371 U.S. National Phase of International Application No. PCT/JP2019/006600, filed on Feb. 21, 2019, which claims priority to Japanese Application No. 2018-029933, filed on Feb. 22, 2018. The entire disclosures of the above applications are incorporated herein by reference.

TECHNICAL FIELD

The present invention relates to a technique for presenting an image in mid-air and, particularly, to a screen forming apparatus, a method, a program, and an image presenting apparatus with superior variability of a viewing angle.

BACKGROUND ART

Conventionally, as a technique for presenting an image in mid-air, for example, a technique for presenting an image by a projector on a fog screen created by vaporizing water using a humidifier is used.

For example, NPL 1 discloses a technique which enables observation from multiple viewpoints by arranging a plurality of fog screens in a cylindrical shape and projecting images from a plurality of locations.

CITATION LIST

Non Patent Literature

[NPL 1] Asuka Yagi, Masataka Imura, Yoshihiro Kuroda, and Osamu Oshiro, "Multi-Viewpoint Interactive Fog Display", Transactions of the Virtual Reality Society of Japan, 17 (2012), 409-417.

SUMMARY OF THE INVENTION

However, with a fog screen created by vaporizing water as in the case of the technique disclosed in NPL 1, a viewing angle is fixed to around 5 to 10 degrees and cannot be varied beyond this range. While a plurality of projectors can be used to widen the viewing angle, since the use of a plurality of projectors is accompanied by increases in complexity and size of a configuration of an entire apparatus, the use of a plurality of projectors is unrealistic.

Since a viewing angle that cannot be varied means that the viewing angle cannot be narrowed, even when an observer thinks that he/she is viewing an image by himself/herself, there is a risk that the image may be seen by those around the observer, which is not preferable from the perspective of privacy. Conversely, even when viewing an image by a plurality of observers, since the viewing angle cannot be widened, it is difficult for the plurality of observers to see the image due to poor visibility.

As described above, with conventional techniques for presenting an image in mid-air, the inability to vary a viewing angle creates a problem in that there are inconveniences from the perspectives of both privacy and visibility.

The present invention has been made in consideration of such circumstances and an object thereof is to provide a screen forming apparatus, a method, a program, and an image presenting apparatus for mid-air image presentation which enable a viewing angle to be varied.

A first aspect of the present invention for achieving the object described above is a screen forming apparatus including: a particle source selecting unit which selects a particle source to be used from a plurality of particle sources having different characteristics regarding a viewing angle; a vaporizing unit which vaporizes particles acquired from the particle source selected by the particle source selecting unit; and a screen forming unit which forms a screen using the particles vaporized by the vaporizing unit.

In addition, a second aspect of the present invention is a screen forming apparatus further including the plurality of particle sources.

Furthermore, a third aspect of the present invention is an image presenting apparatus including: the screen forming apparatus described above; and an image projecting unit constituted by a plurality of projectors that project images toward the screen.

According to the present invention, a screen forming apparatus, a method, a program, and an image presenting apparatus for mid-air image presentation which enables a viewing angle to be varied by selecting particles with different scatter characteristics as particles to form a screen can be realized.

BRIEF DESCRIPTION OF DRAWINGS

FIG. 1 is a block diagram showing a configuration example of an image presenting apparatus according to an embodiment of the present invention.

FIG. 2 is a schematic view showing scattering of light due to particles with strong forward scattering.

FIG. 3 is a schematic view showing scattering of light due to particles with even stronger forward scattering.

FIG. 4 is a schematic view showing scattering in all directions due to particles.

FIG. 5 is a flow chart showing an operation example of the image presenting apparatus according to the embodiment of the present invention.

DESCRIPTION OF EMBODIMENTS

Hereinafter, an embodiment of the present invention will be described with reference to the drawings.

FIG. 1 is a block diagram showing a configuration example of an image presenting apparatus according to an embodiment of the present invention.

An image presenting apparatus 1 includes an image projecting unit 10 and a screen forming apparatus 20.

The screen forming apparatus 20 includes a plurality of particle sources 22, a particle source selecting unit 24, a vaporizing unit 26, a screen forming unit 28, and a communication function unit 30.

Each of the plurality of particle sources 22 has particles with different scatter characteristics regarding a viewing angle. Generally, when a size of a particle is sufficiently larger than a wavelength (400 to 700 nm) of light, geometric optical scattering such as speculator scattering and diffusive scattering occurs. In addition, when a particle ranges from around a same size to around 10 times the wavelength of light, Mike scattering occurs and, as shown in FIG. 2, strong scattering of a particle P occurs with respect to a direction of travel of light. Furthermore, a particle diameter has angle dependence and, as shown in FIG. 3, the larger the particle P, the stronger forward scattering, resulting in the particle P scattering in a narrow angle. In addition, when the particle P is smaller than the wavelength of light, Rayleigh scattering occurs and, as shown in FIG. 4, the particle P scatters in all directions. Furthermore, the particle P has strong wavelength dependence and the shorter the wavelength, the stronger the scattering of the particle P.

Therefore, as a particle for narrowing the viewing angle, a coarse particle that is a larger particle among those that cause Mike scattering such as glycerin is used. In addition, as a particle for widening the viewing angle, a superfine particle that is a smaller particle among those that cause Rayleigh scattering or Mike scattering such as mineral oil is used.

While three particle sources including a particle source 22 (#1), a particle source 22 (#2), and a particle source 22 (#3) are exemplified in FIG. 1 as a plurality of particle sources 22, this is merely an example and there may be two particle sources or four or more particle sources.

A user inputs designation information that designates which particle source 22 is to be selected among the plurality of particle sources 22 to the communication function unit 30 from outside of the image presenting apparatus 1 using a communication function such as radio.

Upon receiving the designation information, the communication function unit 30 outputs the received designation information to the particle source selecting unit 24.

In accordance with the designation information output from the communication function unit 30, the particle source selecting unit 24 selects the particle source 22 to be used from the plurality of particle sources 22.

Alternatively, the user can directly input the designation information to the particle source selecting unit 24.

Accordingly, the screen forming apparatus 20 is able to select a suitable particle source depending on usage from the plurality of particle sources 22 which have different scatter characteristics in order to make an image more visible or less visible from others depending on the situation.

The vaporizing unit 26 vaporizes particles acquired from the particle source 22 selected by the particle source selecting unit 24.

The screen forming unit 28 forms a mid-air screen using the particles vaporized by the vaporizing unit 26.

The image projecting unit 10 is constituted by a plurality of projectors and projects images to the mid-air screen formed by the screen forming unit 28.

Next, an operation example of the image presenting apparatus according to the embodiment of the present invention which is configured as described above will be explained using the flow chart shown in FIG. 5.

First, on the basis of what kind of a screen should be formed in accordance with usage, the user determines which particle source 22 is to be used among the plurality of particle sources 22.

For example, when the user desires to view an image by himself/herself, in order to narrow the viewing angle so that the image cannot be seen by others, the user determines to use a coarse particle that is a larger particle among those that cause Mike scattering such as glycerin. On the other hand, when the user desires to view an image with many others, in order to widen the viewing angle, the user determines to use a superfine particle that is a smaller particle among those that cause Rayleigh scattering or Mike scattering such as mineral oil.

On the basis of the determination, the user inputs designation information that designates which particle source 22 is to be used among the plurality of particle sources 22 to the communication function unit 30 from outside of the image presenting apparatus 1 using a communication function such as radio. The designation information is output from the communication function unit 30 to the particle source selecting unit 24. Alternatively, the user may directly input the designation information to the particle source selecting unit 24 without using the communication function.

In accordance with the designation information, the particle source selecting unit 24 selects the particle source 22 to be used from the plurality of particle sources 22 (SI).

The particles acquired from the particle source 22 selected by the particle source selecting unit 24 are vaporized by the vaporizing unit 26 (S2).

A mid-air screen is formed by the screen forming unit 28 using the particles vaporized by the vaporizing unit 26 (S3).

Images are projected to the mid-air screen from the image projecting unit 10 constituted by a plurality of projectors.

When the mid-air screen is formed of a coarse particle that is a larger particle among those that cause Mike scattering such as glycerin, the viewing angle of the image narrows. When projecting an image with a narrow viewing angle, increasing the number of projectors of the image projecting unit 10 realizes a narrower viewing angle and a higher resolution in an angle direction.

On the other hand, when the mid-air screen is formed of a superfine particle that is a smaller particle among those that cause Rayleigh scattering or Mike scattering such as mineral oil, the viewing angle of the image widens. In this case, a presentable range in the angle direction widens even when the number of projectors in the image projecting unit 10 is small.

As described above, with the image presenting apparatus according to the embodiment of the present invention, due to the workings described above, a particle to form a mid-air screen can be selected in accordance with usage.

Accordingly, for example, when an observer desires to view an image by himself/herself, a mid-air screen with a narrow viewing angle can be formed so that the image cannot be seen by others. Conversely, when the observer desires to view an image with many others, a mid-air screen with a wide viewing angle can be formed.

In summary, the present invention should not be limited to the embodiment described above and may be implemented by modifying components without departing from the scope of the invention. In addition, various inventions can be formed appropriately combining the plurality of components disclosed in the embodiment described above. For example, several components may be deleted from all of the components described in the embodiment. Furthermore, components across various embodiments may be appropriately combined.

REFERENCE SIGNS LIST

1 Image presenting apparatus
10 Image protecting unit
20 Screen forming apparatus
22 Particle source
24 Particle source selecting unit
26 Vaporizing unit
28 Screen forming unit
30 Communication function unit

The invention claimed is:
1. A screen forming apparatus, comprising:
a processor; and
a storage medium having computer program instructions stored thereon, when executed by the processor, perform to:

selects a particle source to be used from a plurality of particle sources having different characteristics regarding a viewing angle;

vaporizes particles acquired from the particle source selected by the particle source selecting unit; and forms a screen using the particles vaporized by the vaporizing unit.

2. The screen forming apparatus according to claim 1, further comprising the plurality of particle sources.

3. An image presenting apparatus, comprising:

the screen forming apparatus according to claim 1; and an image projecting unit constituted by a plurality of projectors that project images toward the screen.

4. A screen forming method, comprising:

selecting a particle source to be used from a plurality of particle sources having different characteristics regarding a viewing angle;

vaporizing particles acquired from the selected particle source; and forming a screen using the vaporized particle source.

5. A non-transitory computer readable medium including instructions executable by one or more processors to:

Select a particle source to be used from a plurality of particle sources having different characteristics regarding a viewing angle;

Vaporize particles acquired from the selected particle source; and

Form a screen using the vaporized particles.

* * * * *